J. Eiberweiser.

Cider Press.

No. 3,791. Reissued Jan. 11, 1870.

Inventor:
John. Eiberweiser

N. PETERS, PHOTO-LITHOGRAPHER, WASHINGTON, D. C.

United States Patent Office.

JOHN S. HALL AND ABEL W. HALL, OF JEFFERSONVILLE, INDIANA, AND J. A. MOORE AND H. BURKHARDT, OF LOUISVILLE, KENTUCKY, ASSIGNEES OF JOHN EIBERWEISER.

*Letters Patent No.* 21,874, *dated October* 26, 1858; *reissue No.* 3,791, *dated January* 11, 1870.

IMPROVEMENT IN CIDER-MILLS.

The Schedule referred to in these Letters Patent and making part of the same.

*To all whom it may concern:*

Be it known that JOHN EIBERWEISER, of Cincinnati, in the county of Hamilton, and State of Ohio, invented a new and useful Improvement in Cider Mills; and we do hereby declare that the following is a full and exact description thereof, reference being had to the accompanying drawings, and to the letters of reference thereon, making part of this specification, and in which—

Figure 1:
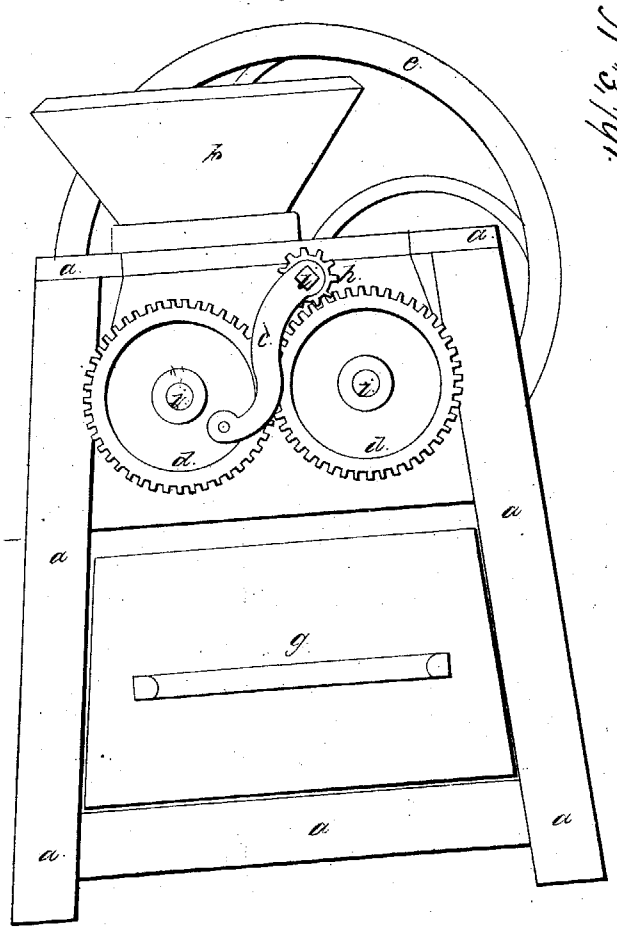
Figure 1 is an end view of the improved mill.

This invention relates to the particular construction and arrangement of the two cylinders which serve the purpose of cutting and mashing the apples; and consists in providing one of the cylinders with ribs or knives, running lengthwise thereof, at a distance of, say, two inches from each other, these ribs or knives being preferably about three-quarters of an inch high; and in making the other cylinder with flutes or channels, corresponding in their number, and in their distance apart, with said knives; and The said invention has for its object the cutting and mashing the apples so as to obtain, without any loss, the full amount of juice contained in the apples, and with the expenditure of the least possible power.

To enable others skilled in the art to make and use the invention, we will proceed to describe its construction and operation.

The whole mill consists of the following parts:

First, the frame, marked *a a*, &c., in the drawings;

Second, the mill hopper, marked *b;*

Third, the crank *c*, (see fig. 1;)

Fourth, the two cog-wheels *d*, with the cylinders attached to them, for imparting motion to the cylinders;

Fifth, the fly-wheel, of say two feet in diameter, and marked *e;*

Sixth, a board, *f*, running from the top board of the frame in an oblique direction, toward the fluted cylinder, and offering the necessary resistance to effect the proper breaking or cutting of the apples by the ribs or knives; and, Seventh, the box *g*, to receive the pomace.

To the crank is attached a small cog-wheel, *h*, for driving the cylinders, and which gears with one of the cog-wheels *d*.

Figure 2:
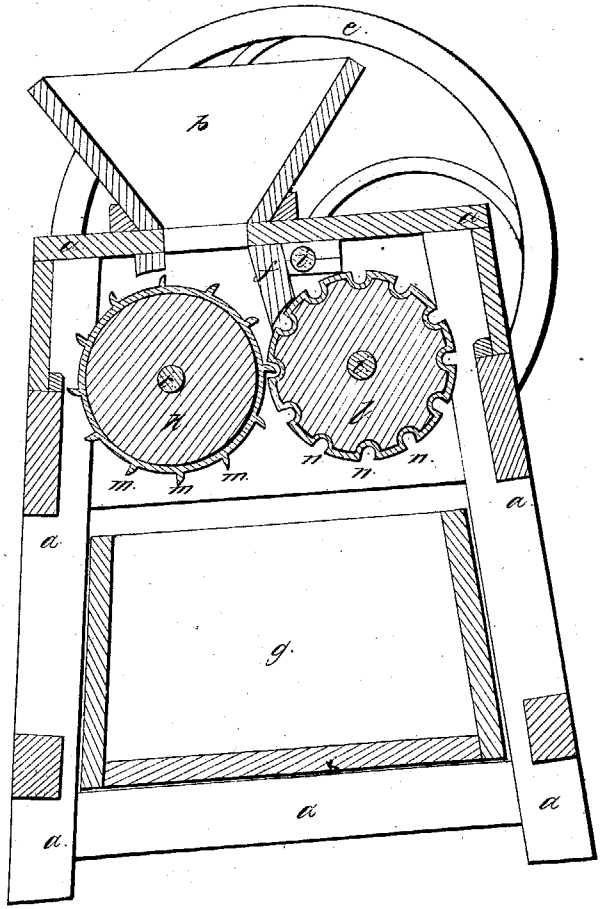
Figure 2 is a vertical section of the same through the middle.

Fig. 2 shows the two cylinders, which cut and mash the apples, and which are marked *k* and *l*, each being preferably about nine inches in diameter.

The dimensions above set forth may, of course, be varied, either any or all, without departing from my invention.

The two cylinders should be placed as close together as practicable, say not further than an eighth of an inch apart.

The cylinder *k* is provided with ribs or knives, as above stated; and on cylinder *l* will be found the corresponding flutes or channels *n*, which receive the said ribs.

These channels or flutes are made curved at their bottoms, and of proper depths to receive the ribs *m*, which, as the cylinders revolve coincidently, sweep whilst within and passing out of said flutes. Each rib thus acts as a clearer as well as a masher.

The mill-hopper being filled with apples, and the mill set in motion, the apples are forced against the board *f*, and then carried forward by the ribs or knives, between the two cylinders, and mashed into pomace. The pomace is then received in the box *g*.

What is claimed as the invention, is—

An improved crushing mechanism for cider-mills, consisting of two rollers, the one formed with a series of longitudinal grooves or channels, and the other with a series of correspondingly-distant ribs or knives, which enter the said grooves or channels, the two rollers being arranged relatively to each other, and operating substantially as shown and described.

JOHN S. HALL.
J. A. MOORE.
H. BURKHARDT.
ABEL W. HALL.

Witnesses:
C. W. MOORE,
J. G. MOORE.